(12) United States Patent
Shimokawa et al.

(10) Patent No.: US 6,445,471 B1
(45) Date of Patent: Sep. 3, 2002

(54) APPARATUS AND METHOD FOR MAKING TRANSMISSION CHARACTERISTICS UNIFORM IN A WAVELENGTH DIVISION MULTIPLEXING OPTICAL COMMUNICATIONS SYSTEM

(75) Inventors: Hiroyuki Shimokawa; Shinichiro Harasawa, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/358,372

(22) Filed: Jul. 21, 1999

(30) Foreign Application Priority Data

Dec. 18, 1998 (JP) .......................................... 10-360572

(51) Int. Cl.⁷ ................................................ H04J 14/02
(52) U.S. Cl. ...................... 359/124; 359/161; 359/187
(58) Field of Search ................................ 359/124, 127, 359/154, 161, 173, 180, 187, 189

(56) References Cited

U.S. PATENT DOCUMENTS 5,790,289 A * 8/1998 Taga et al. .................. 359/124
5,877,879 A * 3/1999 Naito ...................... 359/161 X
6,134,034 A * 10/2000 Terahara ..................... 359/124
6,185,022 B1 * 2/2001 Harasawa ................... 359/124

FOREIGN PATENT DOCUMENTS

| JP | 8-321824 | 12/1996 |
| JP | 11-103287 | 4/1999 |

* cited by examiner

*Primary Examiner*—Thomas Mullen
(74) *Attorney, Agent, or Firm*—Staas & Halsey LLP

(57) ABSTRACT

In setting pre-emphasis at the transmitting end, each optical signal outputted from a laser diode and an amplified spontaneous emission noise outputted from an ASE output unit are multiplexed at a coupler, and the output power of the amplified spontaneous emission noise, at that time, is changed by an attenuator. In this case, the difference between a reference value, which is the value of an OSNR corresponding to the target lower limit of a Q-value at the receiving end, and the value of a current OSNR is calculated as a margin. Then, the attenuator is controlled so that the margin of an OSNR becomes equal to the average of the margins for all optical signals.

20 Claims, 14 Drawing Sheets

APPARATUS AND METHOD FOR MAKING TRANSMISSION CHARACTERISTICS UNIFORM IN A WAVELENGTH DIVISION MULTIPLEXING OPTICAL COMMUNICATIONS SYSTEM

BACKGROUND OF THE INVENTION

1. Field of the Invention

The present invention relates to a wavelength division multiplexing optical communications technology, and more particularly to a technique for making transmission characteristics uniform for transmitting all optical signals with the same transmission characteristics.

2. Description of the Related Art

In a wavelength division multiplexing (WDM) optical communications system, transmitting all optical signals with the same transmission characteristics is referred to as optimization of transmission characteristics. In the wavelength division multiplexing optical communications system, as shown in FIG. 1, the deterioration of transmission characteristics occurs in a transmitter, a transmission line, and a receiver. Moreover, the deterioration conditions of transmission characteristics differ between optical signals.

Furthermore, when operating a system, the deterioration conditions of transmission characteristics are different between optical signals, due to various causes, such as the repair of an amplifier or a cable, which results from repairs conducted in a transmission section, and the deterioration of a fiber due to age.

Therefore, pre-emphasis must always be set for each optical signal at the transmitting end, and transmission characteristics must always be optimized at the receiving end. Note that pre-emphasis refers to controlling the power of each optical signal.

The difference in transmission characteristics between optical signals can be observed at the receiving end, as differences in an OSNR (Optical Signal to Noise Ratio), BER (Bit Error Rate), or Q-value.

FIG. 2 shows in the prior art the relation between pre-emphasis and an OSNR after transmission.

Making an OSNR uniform at the receiving end so as to optimize transmission characteristics is a well-known technique in the prior art. In this technique, the OSNR difference between optical signals, which is calculated by monitoring the OSNR for each optical signal at the receiving end, is fed back to the transmitting end as a pre-emphasis value, thereby enabling pre-emphasis to be set at the transmitting end. Adjusting an OSNR by directly changing the output power of each optical signal is a general method for setting pre-emphasis.

As a result, if a transmit light spectrum 1, for which no pre-emphasis is set, is transmitted on a transmission line, the OSNR of a receive light spectrum 1, which corresponds to the transmit light spectrum 1, varies greatly. However, if a transmit light spectrum 2, for which pre-emphasis is set, is transmitted on a transmission line, the variance of the OSNR of a receive light spectrum 2, which corresponds to the transmit light spectrum 2, is reduced.

FIG. 3 shows the configuration of a transmitter of the prior art. FIG. 4 shows the configuration of a receiver of the prior art.

First, operations of the transmitter, which has a configuration as shown in FIG. 3, are explained below.

The transmitter has, for each wavelength, a laser diode driver (LD DRIVER) 1201, a laser diode (LD) 1202, an attenuator (ATT) 1203, a coupler (CPL) 1204, a post amplifier (POST AMP) 1205, and a photodiode (PD) 1208. The laser diode driver 1201 drives the laser diode 1202, while adjusting the output power and wavelength corresponding to each optical signal. The optical signal outputted from the laser diode 1202 is inputted to the post amplifier 1205 via the attenuator 1203 and the coupler 1204, and the optical signal is amplified in the post amplifier 1205. The optical signals, each of which is outputted from the post amplifier 1205, are multiplexed by an arrayed waveguide grating (AWG) 1206, and the multiplexed optical signal is outputted to a transmission line via a coupler 1207.

In the configuration shown in FIG. 3, the coupler 1204 branches part of each optical signal to the photodiode 1208, resulting in part of the optical signal being detected by the photodiode 1208. The detection results are inputted to a CPU 1210. Meanwhile, part of the transmitted optical signal, which is outputted from the AWG 1206 to a transmission line, is branched and inputted to an optical spectrum analyzer 1209 by the coupler 1207. The optical spectrum analyzer 1209 monitors the peak power and wavelength of the transmitted optical signal, and notifies the CPU 1210 of the results. The CPU 1210 controls the laser diode driver 1201 and attenuator 1203 based on the output from the photodiode 1207 and optical spectrum analyzer 1209, for each optical signal.

Next, operations of the receiver, which has a configuration as shown in FIG. 4, are explained below.

At the receiver, an optical signal received through a transmission line is inputted via a coupler 1301 to an AWG 1302, where the optical signal is demultiplexed into optical signals of various wavelengths.

The receiver has, for each wavelength, a filter 1303 for separating an optical signal of a specific wavelength, an inline amplifier (INLINE AMP) 1304, a dispersion compensating fiber (DCF) 1305, an optical-electrical converter (O/E) 1306, a forward error corrector (FEC) 1307, and an electric-signal demultiplexer (DEMUX) 1308.

In the configuration according to the prior art, as shown in FIG. 4, the coupler 1301 branches part of a received optical signal into an optical spectrum analyzer 1309. The optical spectrum analyzer 1309 measures the OSNR for each optical signal received, and notifies a CPU 1310 of the results. The CPU 1310 feeds back the OSNR differences between optical signals received, as a pre-emphasis value, to the transmitting end by using a prescribed communications line.

However, in the transmitter, which has a configuration as shown in FIG. 3, the CPU 1210 receives the above-mentioned pre-emphasis value, and controls the laser diode driver 1201 for each optical signal, based on the pre-emphasis value.

As stated above, the prior art is aware of an OSNR so as to optimize transmission characteristics, and makes uniform only an OSNR used for all optical signals. Usually, the most important factor of the transmission characteristics in digital transmission is a transmission error rate. Therefore, it is important to make uniform a transmission error rate for all optical signals in the optimization of transmission characteristics. However, in the prior art, even if an OSNR is made uniform for all optical signals, the transmission error rate is not necessarily made uniform for all optical signals.

Thus, with respect to a transmission error rate, the examples of which are a BER and a Q-value, the prior art has a problem, as shown in FIG. 5A, in that even if the OSNR is made uniform for optical signals 1, 2 and 3, the transmission error rate does not become uniform because of the difference of Q-values of the optical signals.

Furthermore, in the prior art, to set pre-emphasis at the transmitting end, the CPU 1210 directly changes the output power of the laser diode 1202 by controlling the laser diode driver 1201, for each optical signal. However, this method has a problem in that the setting of pre-emphasis for each optical signal must be repeated, while maintaining the power balance of optical signals, because the peak power of the other optical signals simultaneously change, resulting in the set value of pre-emphasis for each optical signal deviating from a proper value.

SUMMARY OF THE INVENTION

In view of the above background, the present invention aims at achieving real optimization of transmission characteristics, by making uniform a transmission error rate for all optical signals at the receiving end, based on the adjustment of an OSNR at the transmitting end.

The present invention supposes an apparatus or method for making uniform transmission characteristics in the wavelength division multiplexing optical communications system.

The apparatus according to a first aspect of the present invention has the following configuration.

First, the relation between changes in a signal-to-noise ratio and changes in a transmission error rate at the receiving end is calculated for each optical signal to be wavelength-division-multiplexed.

Next, based on the relation, the signal-to-noise ratio for each optical signal is changed so as to attain a uniform transmission error rate for all optical signals at the receiving end.

The apparatus according to a second aspect of the present invention has the following configuration.

First, for each optical signal to be wavelength-division-multiplexed, the difference between a reference value, which is the value of a signal-to-noise ratio corresponding to the target lower limit of a transmission error rate at the receiving end, and the value of a current signal-to-noise ratio is calculated as a margin.

Next, for each optical signal, a signal-to-noise ratio is controlled so that the margin of the signal-to-noise ratio becomes equal to a prescribed value which is obtained from the margins calculated for the optical signals.

The apparatus according to a third aspect of the present invention has the following configuration.

First, the initial value of a signal-to-noise ratio is stored for each optical signal to be wavelength-division-multiplexed.

Next, for each optical signal, an amplified spontaneous emission noise is superposed on the optical signal so as to gradually reduce the signal-to-noise ratio until a transmission error rate at the go receiving end decreases to a target lower limit.

When the transmission error rate at the receiving end decreases to the target lower limit, the value of the corresponding signal-to-noise ratio is stored as a target lower limit, for each optical signal.

Subsequently, for each optical signal, the difference between the stored initial value and the stored target lower limit is calculated as a margin.

Next, for each optical signal, the difference between a prescribed value which is obtained from the margins calculated for the optical signals, and the stored initial value is calculated as the pre-emphasis amount of the signal-to-noise ratio corresponding to the optical signal.

Then, for each optical signal, the signal-to-noise ratio is controlled by superposing an amplified spontaneous emission noise corresponding to the pre-emphasis amount on the optical signal.

Here, the above-mentioned superposition of the amplified spontaneous emission noise on the optical signal is conducted at the transmitting end. Alternatively, it is possible to provide the apparatus with a configuration in which the above-mentioned superposition is conducted at the receiving end.

In the above-mentioned configuration of the invention, the prescribed value, which is obtained from the margins for optical signals, can be the average of the margins for the optical signals.

In the above-mentioned configuration of the invention, either a Q-value or a bit error rate can be used as a transmission error rate.

According to the above-mentioned configurations of the invention, it is possible to achieve real optimization of transmission characteristics, because the relation between changes in a signal-to-noise ratio and changes in a transmission error rate at the receiving end is calculated for each optical signal so as to optimize transmission characteristics, and based on the calculation results, the signal-to-noise ratio for each optical signal is changed so as to make uniform a transmission error rate for all optical signals at the receiving end.

BRIEF DESCRIPTION OF DRAWINGS

From the accompanying drawings and the description of the preferred embodiments of the present invention, the other objects or characteristics of the present invention can be easily understood by persons having ordinary skill in the art.

DESCRIPTION OF THE PREFERRED EMBODIMENTS

With reference to the drawings, detailed explanations of each preferred embodiment of the present invention are given below.

Figure 6:
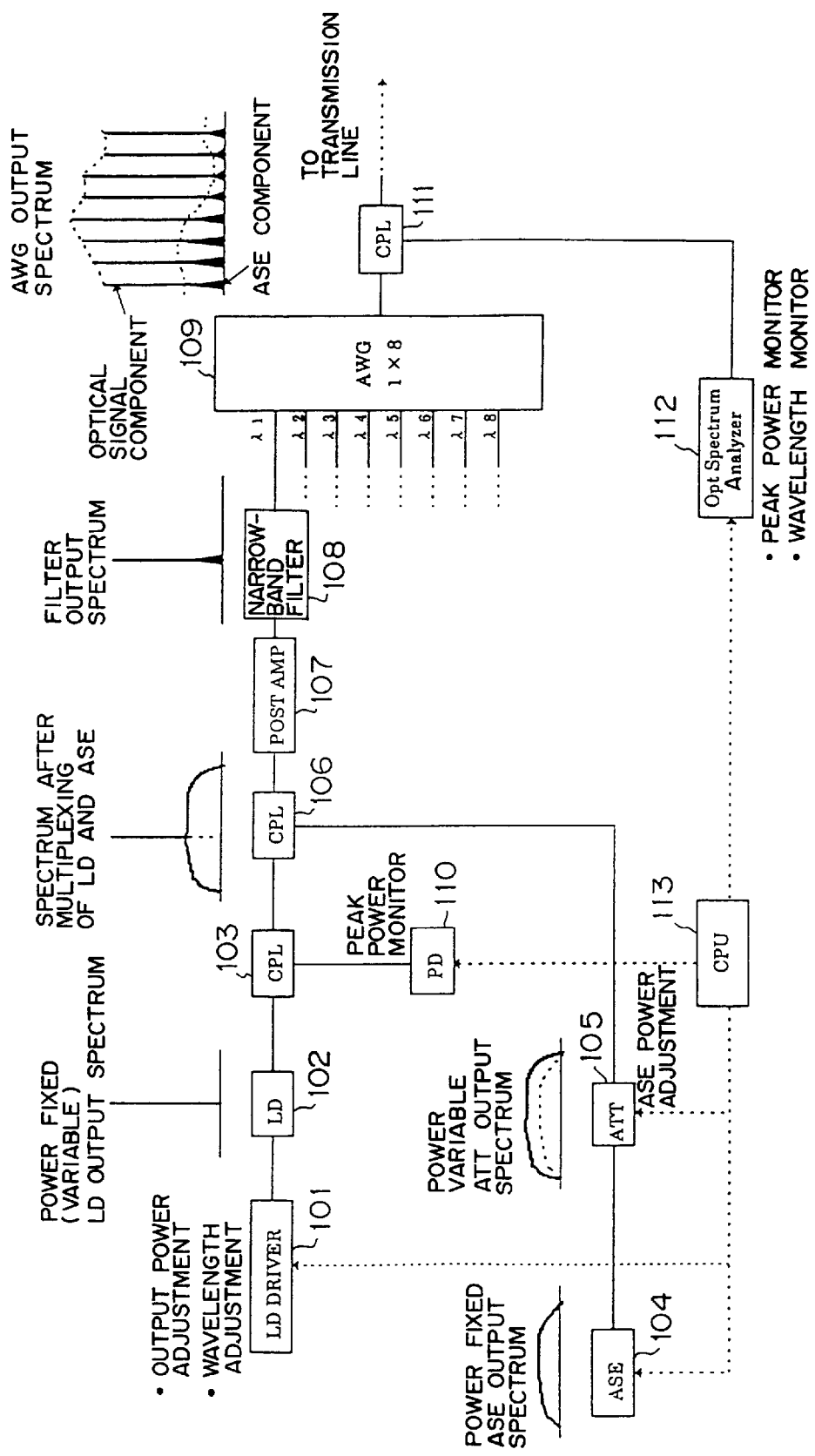
FIG. 6 shows the configuration of a transmitter according to a preferred embodiment of the present invention.
Figure 7:
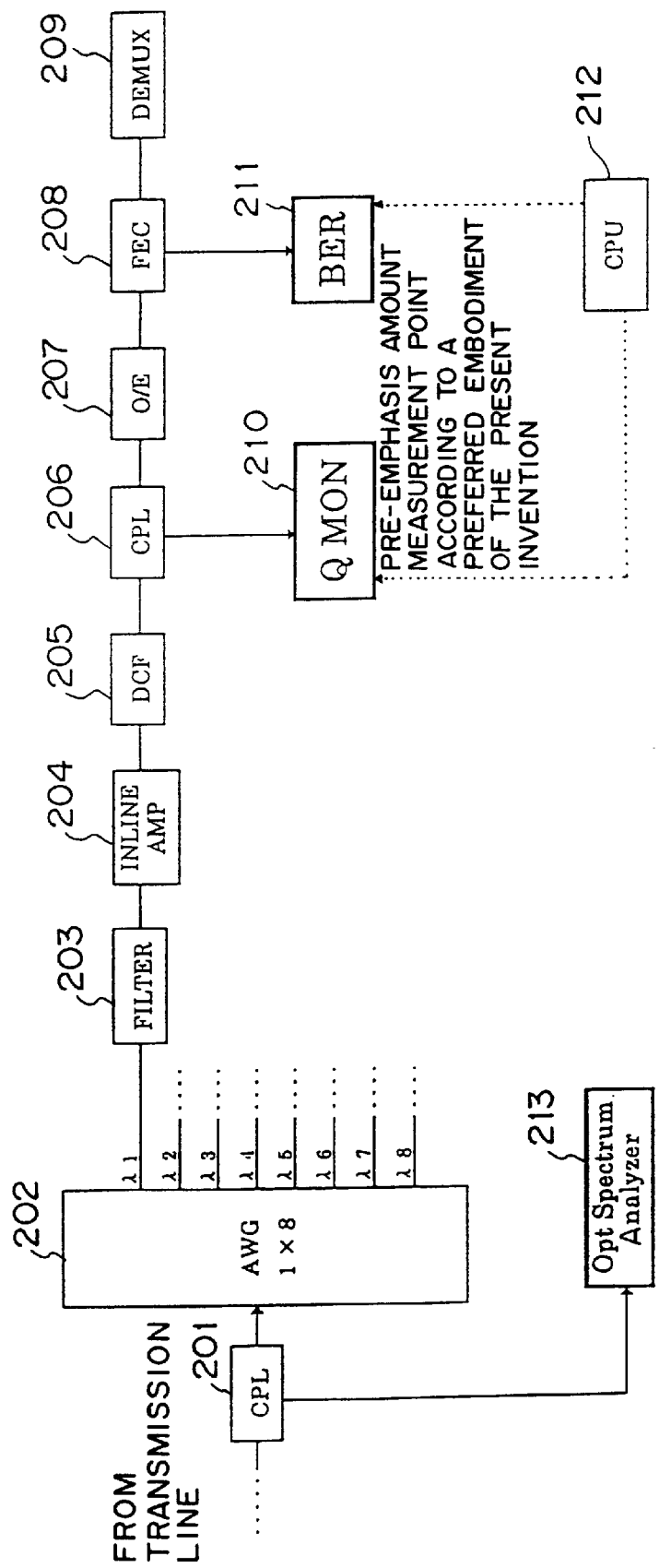
FIG. 7 shows the configuration of a receiver according to a preferred embodiment of the present invention.

FIGS. 6 and 7 show the configuration of a transmitter and a receiver, respectively, according to a preferred embodiment of the present invention.

Figure 1:
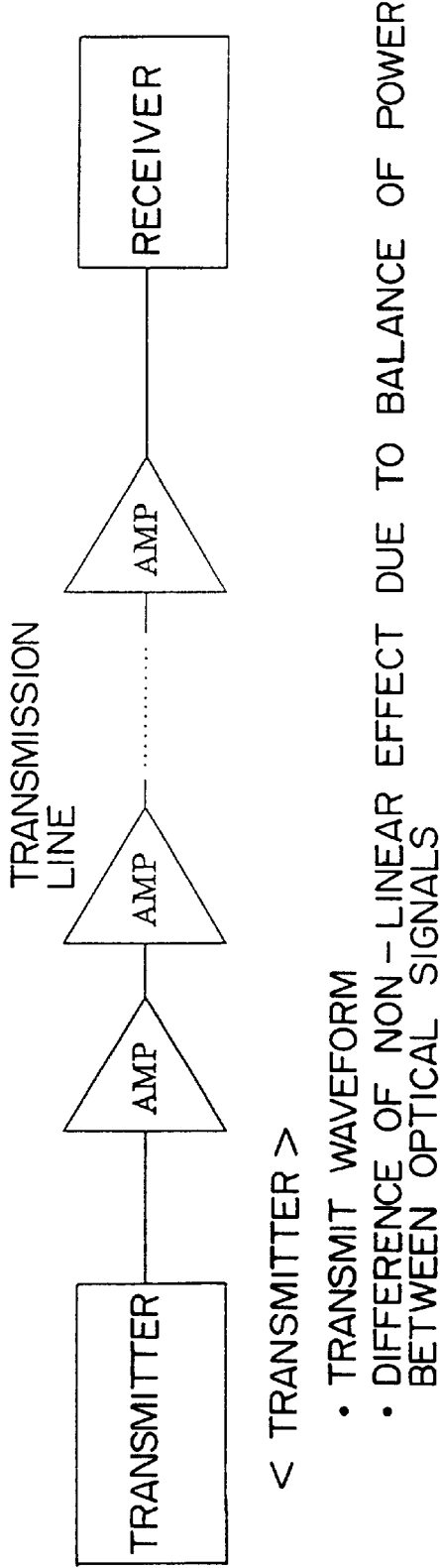
FIG. 1 is a diagram showing the causes of deterioration in transmission characteristics.
Figure 2:
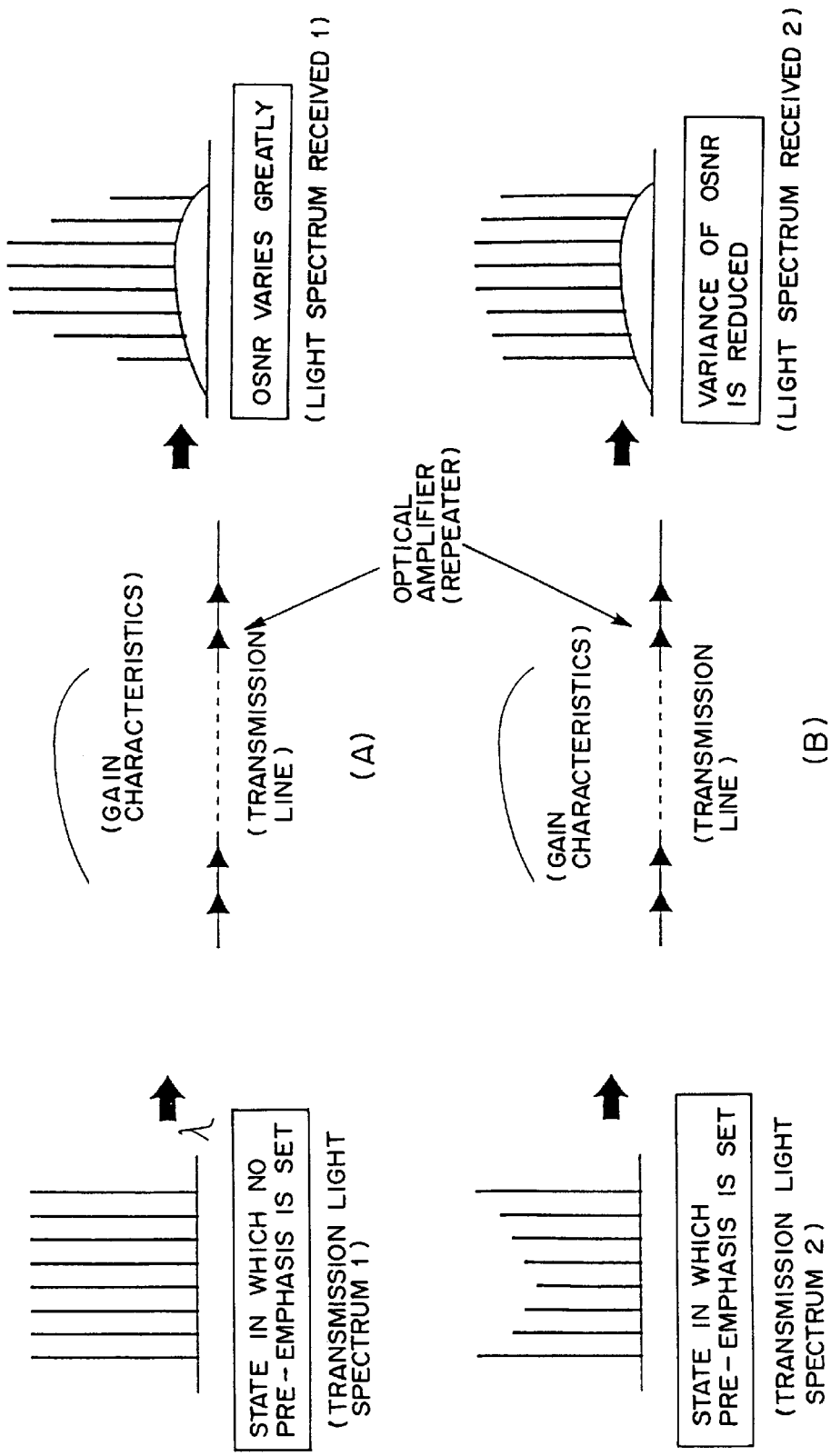
FIG. 2 shows the relation between pre-emphasis and a SNR after transmission in the prior art.
Figure 3:
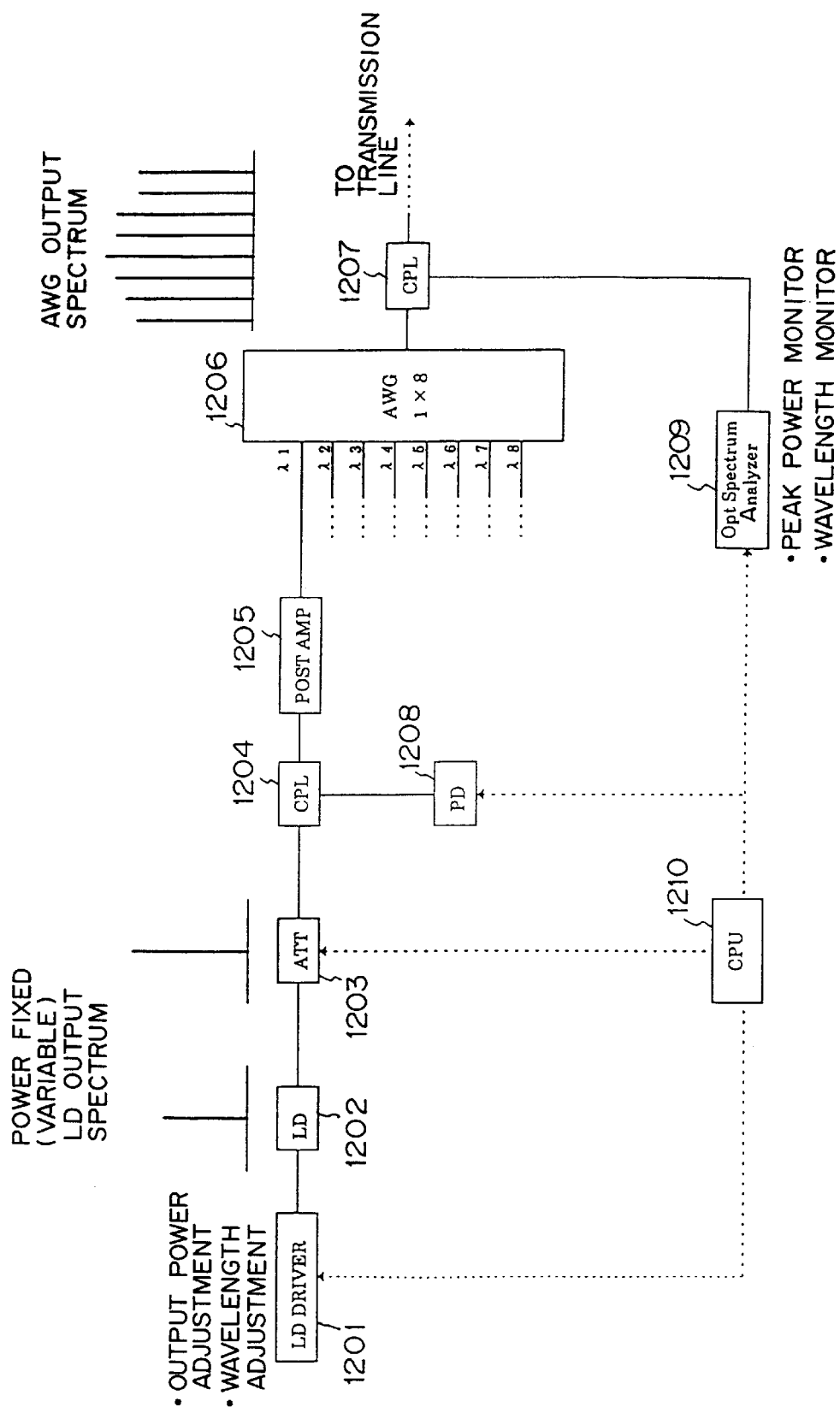
FIG. 3 shows the configuration of a transmitter in the prior art.

FIG. 6 shows a laser diode driver 101, a laser diode 102, a coupler 103, a post amplifier 107, an AWG 109, a photodiode 110, a coupler 111, and an optical spectrum analyzer 112, which have the same functions as the matching components of the prior art, 1201, 1202, 1204, 1205, 1206, 1208, 1207, and 1209, respectively, as shown in FIG. 3.

Figure 4:
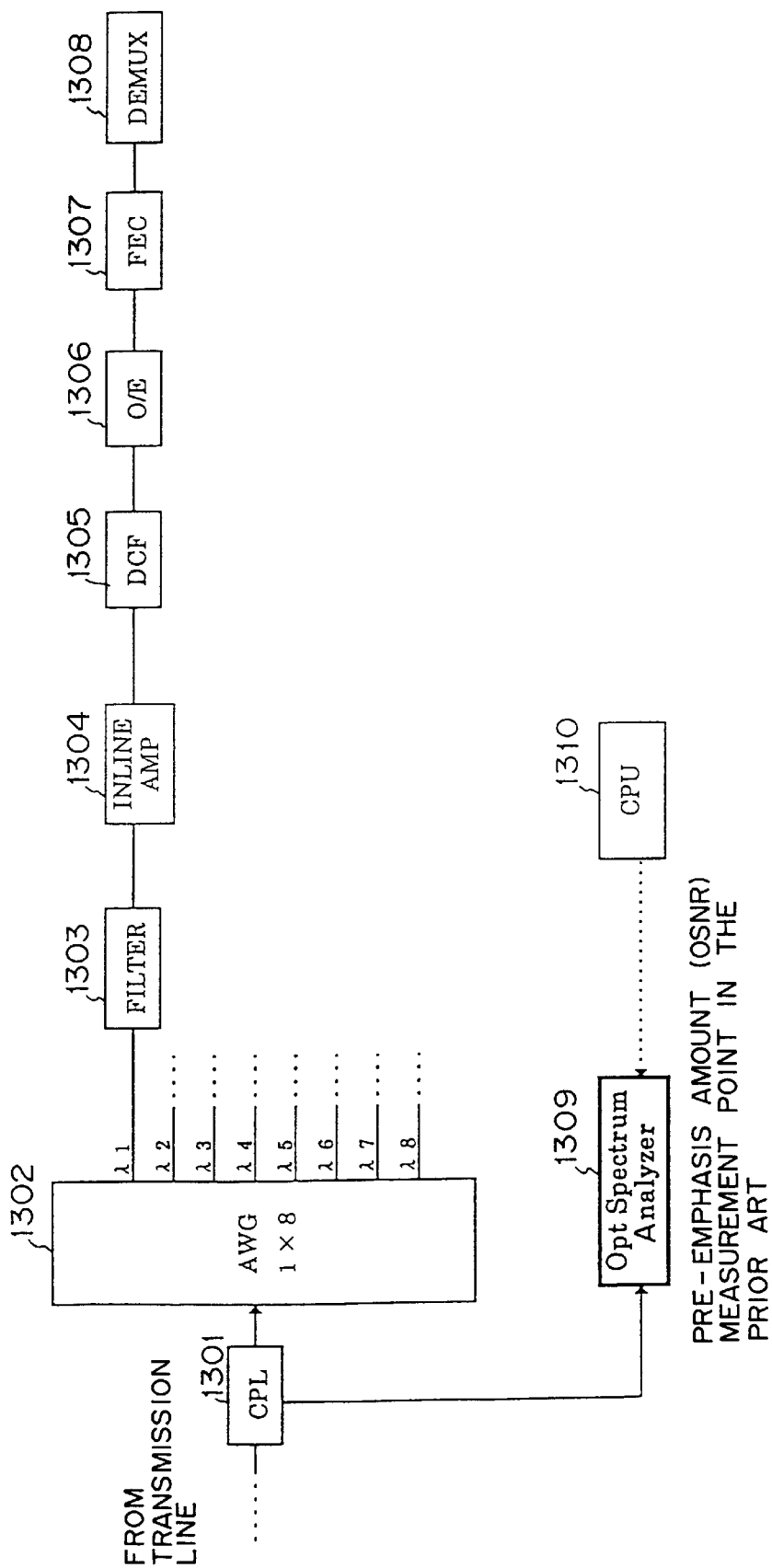
FIG. 4 shows the configuration of a receiver in the prior art.

FIG. 7 shows a coupler 201, an AWG 202, a filter 203, an inline amplifier 204, a dispersion compensating fiber 205, an optical-electrical converter 207, a forward error corrector 208, an electric-signal demultiplexer 209, and an optical spectrum analyzer 213, which have the same functions as the matching components of the prior art, 1301–1309, respectively, as shown in FIG. 4.

Figures 5A, 5B:
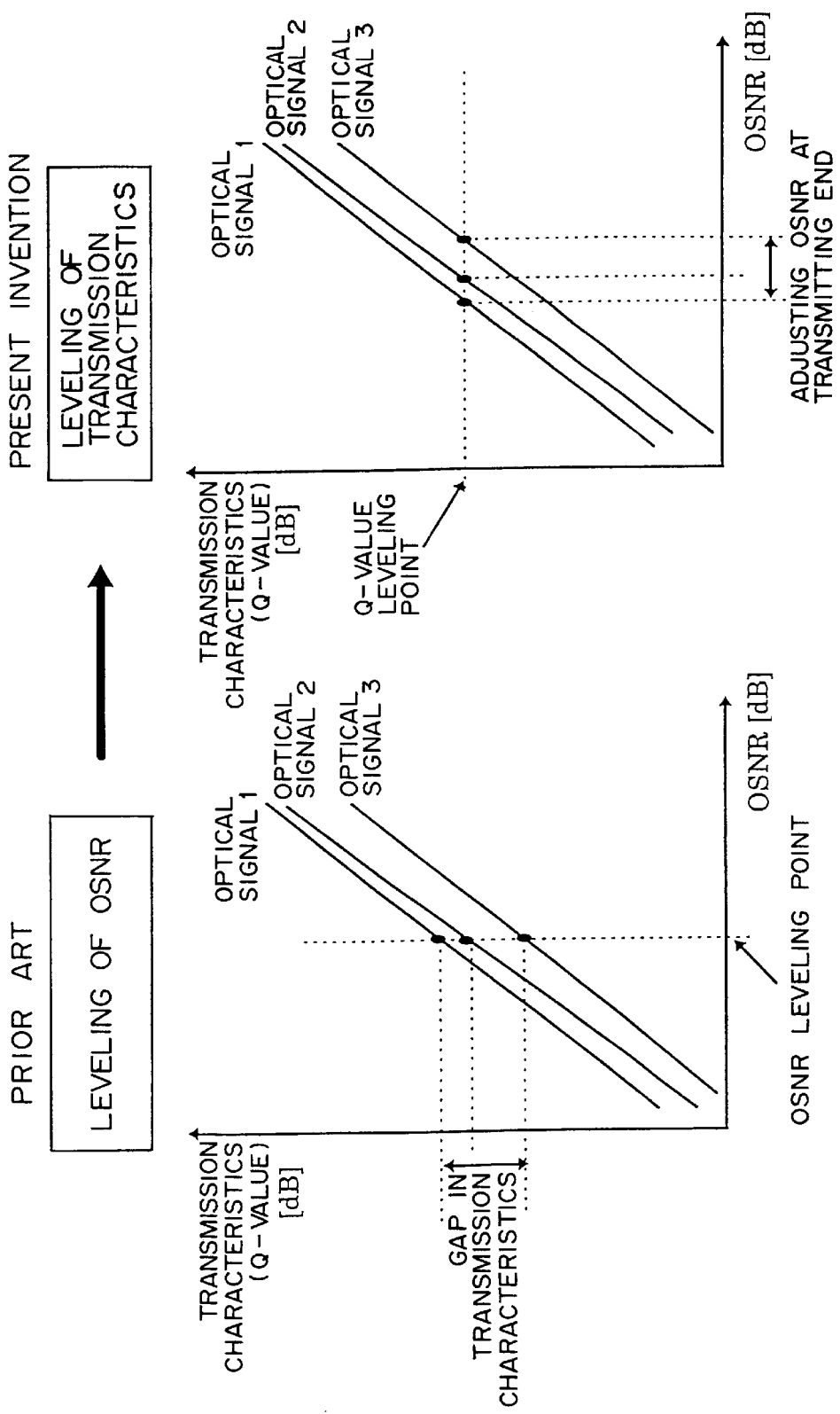
FIG. 5A shows the relation between a Q-value (transmission characteristics) and an OSNR in the prior art.
FIG. 5B shows the relation between a Q-value (transmission characteristics) and an OSNR according to a preferred embodiment of the present invention.

It is clear, from FIG. 5B, that an ideal factor for transmission characteristics, such as a Q-value and a BER, changes as an OSNR changes, for each optical signal. This preferred embodiment includes the following features, which are the characteristics of the present invention: the relation between changes in an OSNR and changes in a Q-value or BER at the receiving end is calculated based on the relation as shown in FIG. 5B, so as to optimize transmission characteristics for each optical signal; and based on the calculation results, the OSNR for each optical signal is changed so as to make uniform the Q-value or BER for all optical signals at the receiving end.

More specifically, in this preferred embodiment, which has the configuration as shown in FIGS. 6 and 7, the difference between a reference value, which is the value of an OSNR at the transmitting end that corresponds to the target lower limit of a Q-value or BER at the receiving end, and the value of a current OSNR at the transmitting end is calculated as a margin for each optical signal. Then, the average of the margins for all optical signals are calculated, and pre-emphasis for the OSNR at the transmitting end is set for each optical signal so that the margin of the OSNR for each optical signal equals the average value. Note that in this process for controlling the OSNR for each optical signal, the amount of change in a Q-value or BER at the receiving end, per unit amount of change in an OSNR at the transmitting end, is assumed to be approximately uniform.

In the case of the measurement of a Q-value at the receiving end, part of each optical signal received, which is separated by the coupler 206 as shown in FIG. 7, is inputted to a Q monitor (Q MON) 210, and is measured there.

In the case of the measurement of a BER at the receiving end, the output from the forward error corrector 208, as shown in FIG. 7, is inputted to a BER measuring unit 211, and is measured there.

In setting pre-emphasis at the transmitting end, as shown in FIG. 6, the output from the laser diode 102 assigned to each optical signal and an amplified spontaneous emission noise (ASE), outputted from an ASE output unit 104, are multiplexed at a coupler 106, and the output power of the amplified spontaneous emission noise is changed by an attenuator 105. In this case, the multiplexed optical signal is amplified by the post amplifier 107, and then inputted to the AWG 109 via a narrow-band filter 108. Therefore, pre-emphasis can be set for all optical signals simultaneously, without losing the balance of power between the optical signals.

An explanation of specific operations required for performing the above procedure is given below.

First, the premise of the above function is explained.

It is difficult to measure an OSNR at the stage following to the narrow-band filter 108, since the measurement point of an amplified spontaneous emission noise cannot be set easily. Therefore, the OSNR for each optical signal is measured at the stage preceding the narrow-band filter 108.

The power and wavelength of the output from the laser diode 102 is monitored by the photodiode 110. Based on the monitoring results, a CPU 113 corrects the set value of the above-mentioned output power and wavelength, by performing a feedback to the laser diode driver 101. The output power of the amplified spontaneous emission noise outputted from the ASE output unit 104 is maintained so it is constant by an APC (automatic power control), and the wavelength characteristics of the amplified spontaneous emission noise are flat. Then, the CPU 113 calculates and stores the initial value of an OSNR, $E_{a1}$, which is the ratio of the output power from the laser diode 102 that is detected by the photodiode 110 to the output power of an amplified spontaneous emission noise that is determined by the APC in the ASE output unit 104. In addition, the CPU 113 calculates the amount of change in an OSNR, as the amount of adjustment to be conducted by the attenuator 105.

Figure 8:
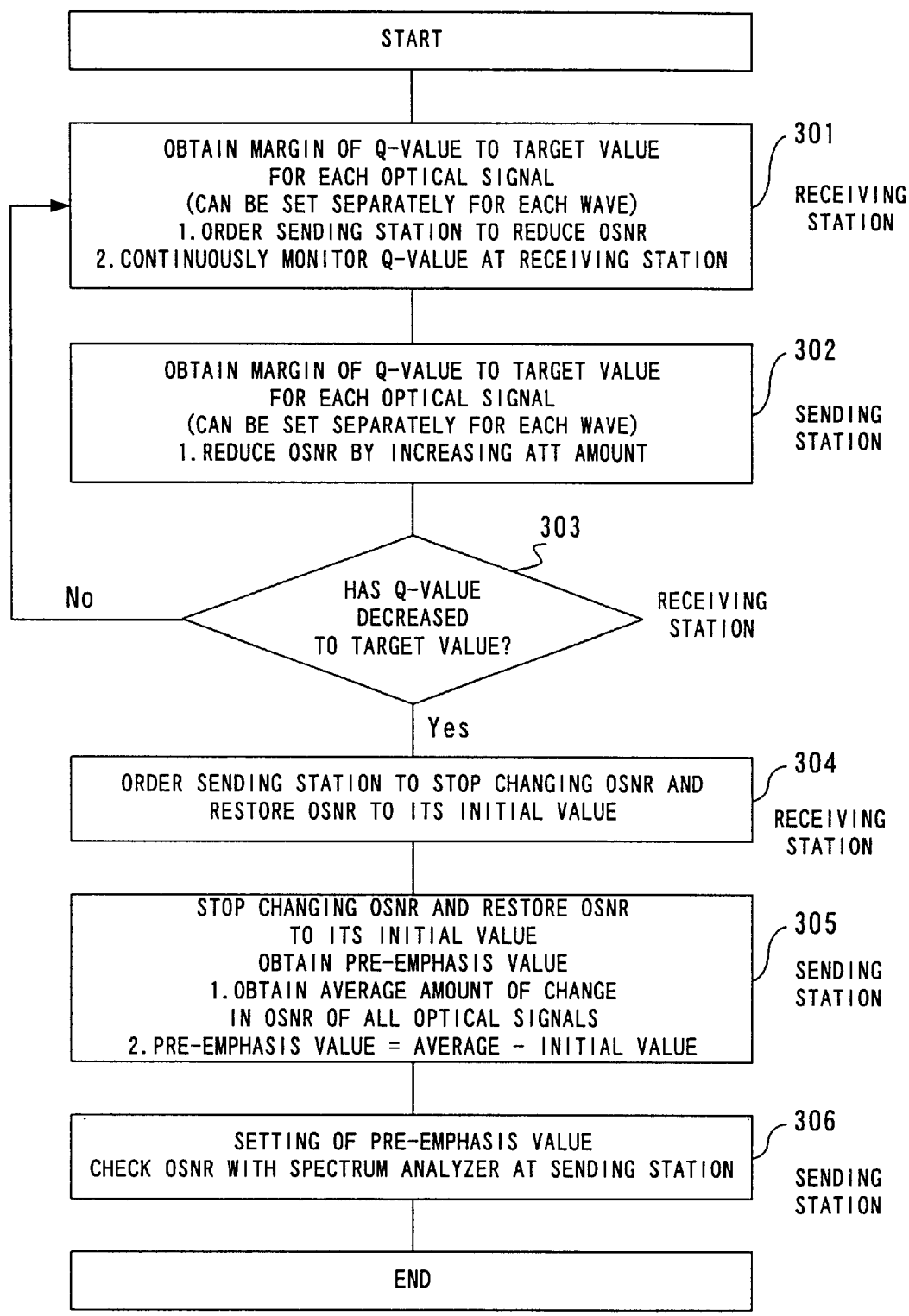
FIG. 8 is a flowchart showing the operations according to a preferred embodiment of the present invention.
Figures 9A, 9B:
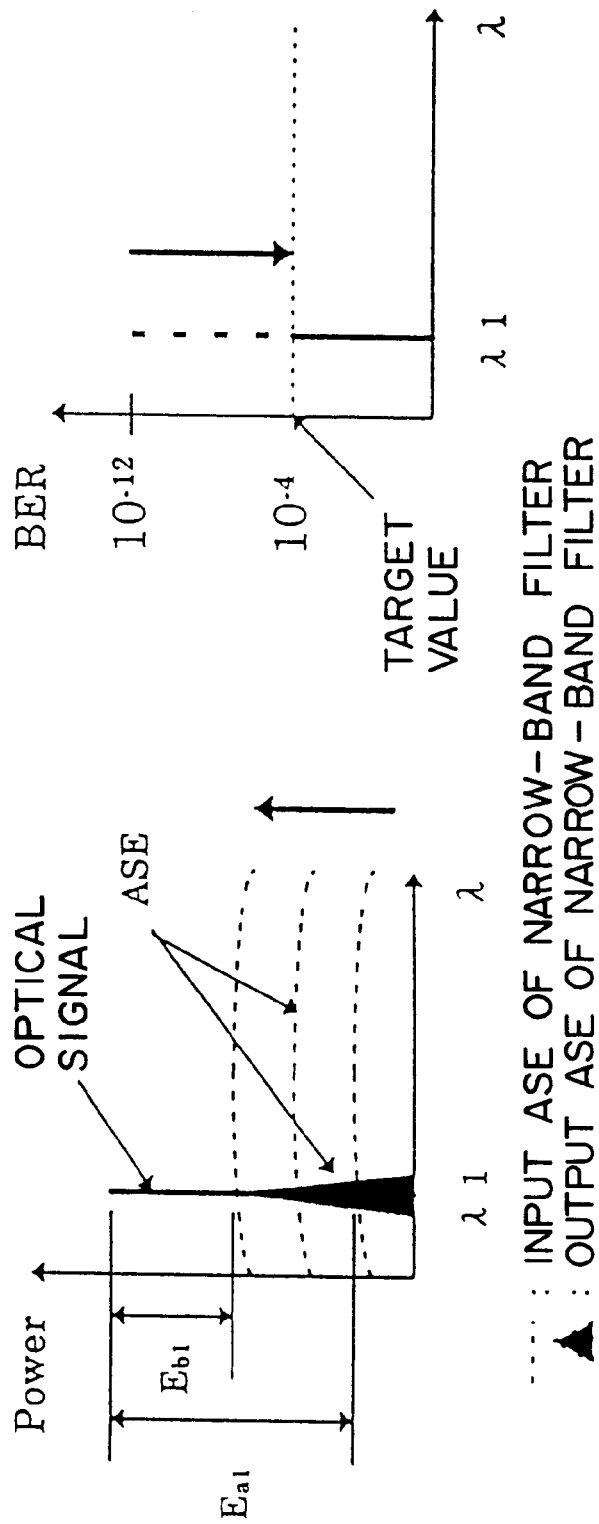
FIGS. 9A and 9B show the variable range of an OSNR at the transmitting end.

FIG. 8 is a flowchart showing operations for achieving the above-mentioned function according to the preferred embodiment of the present invention, and FIGS. 9A/B-11 are explanatory diagrams thereof. Note that the case in which a Q-value is monitored at the receiving end is assumed in the following explanations.

First, as a CPU 212 of the receiver (FIG. 7) continuously monitors a Q-value for each optical signal via the Q monitor 210 (FIG. 7), the CPU 212 orders the transmitter to reduce an OSNR, by using a prescribed communications channel (step 301).

When receiving the above order, the CPU 113 of the transmitter (FIG. 6) reduces the OSNR for each optical signal by directing the attenuator 105 to increase the amount of attenuation (step 302).

The CPU 212 of the receiver determines, for each optical signal, whether the Q-value measured via the Q monitor 210 has decreased to the target lower limit (see FIG. 9B)(step 303).

If NO is determined in step 303, the CPU 212 of the receiver repeats the operations in steps 301 and 302 for each optical signal.

As stated above, the OSNR is reduced for each optical signal by gradually increasing an amplified spontaneous emission noise (ASE) to be superposed on the optical signal at the transmitting end, as shown in FIG. 9A, until the BER or Q-value at the receiving end decreases to the target lower limit, as shown in FIG. 9B.

If YES is determined in step 303, the CPU 212 of the receiver orders the transmitter, by using the prescribed communications channel, to stop changing the OSNR, and restores the value of the OSNR to its initial value for each optical signal (step 304).

In response, the CPU 113 of the transmitter executes a series of processes as follows (step 305).

First, when receiving the above-mentioned order, the CPU 113 stops the OSNR changing at a current value $E_{b1}$ for each optical signal, and calculates the amount of change in an OSNR, $E_1$, as a margin, according to the following equation:

$$E_1 = |E_{a1} - E_{b1}| \quad \text{[Equation 1]}$$

Next, after completing the calculation of the margin of the OSNR for each optical signal according to Equation 1, the CPU 113 calculates an average $E_{AVG}$ of the margins for all optical signals according to the following equation:

$$E_{AVG} = (E_1 + E_2 + \cdots + E_n) \quad \text{[Equation 2]}$$

(n: the number of optical signals)

Figure 10:
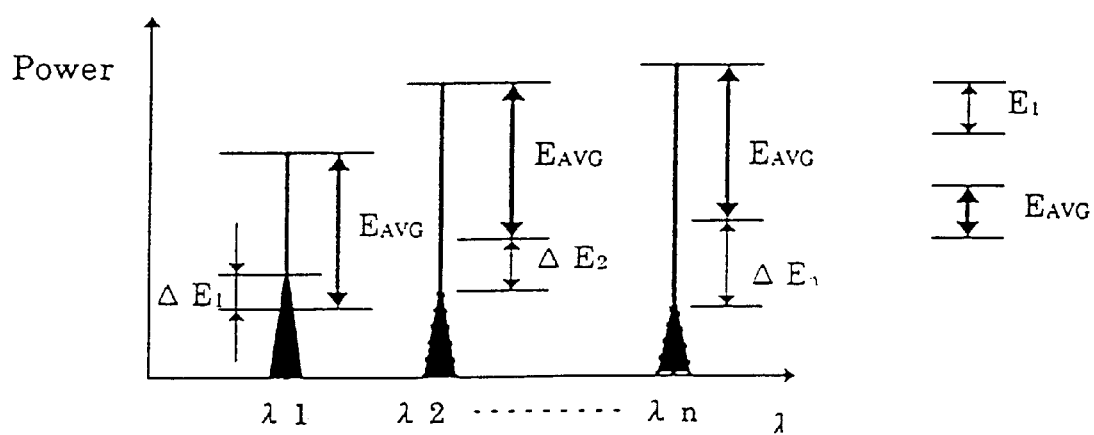
FIG. 10 shows the pre-emphasis value of an optical signal at the transmitting end.

Subsequently, for each optical signal, the CPU 113 calculates a pre-emphasis value $\Delta E_1 \sim \Delta E_n$, as given by the following equations, which is the difference between the average $E_{AVG}$, as calculated according to Equation 2, and the margin of the OSNR for each optical signal, as calculated according to Equation 1 (see FIG. 10):

$$\Delta E_1 = E_{AVG} - E_{a1} \quad \text{[Equation 3]}$$
$$\Delta E_2 = E_{AVG} - E_{a2}$$
$$\cdots$$
$$\Delta E_n = E_{AVG} - E_{an}$$

Figure 11:
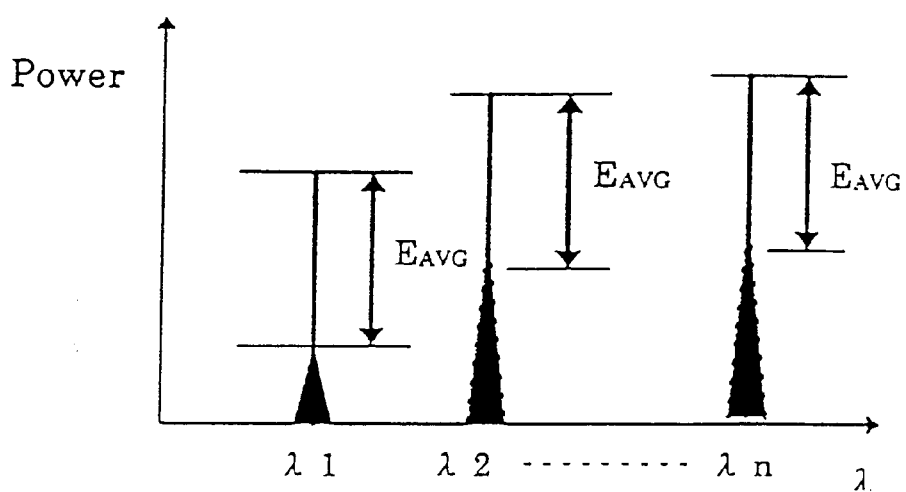
FIG. 11 shows the setting of pre-emphasis for an optical signal at the transmitting end.

The CPU 113 controls the OSNR for each optical signal so that the OSNR equals the average $E_{AVG}$, by setting, for each optical signal, an amount of attenuation to be performed by the attenuator 105 that corresponds to the pre-emphasis amount $\Delta E_1 \sim \Delta E_n$ as calculated according to Equation 3 (see FIG. 11).

Thereafter, the CPU 113 executes feedback control by monitoring the output from the optical spectrum analyzer 112 (FIG. 6) so that the OSNR for each optical signal is exactly equal to $E_{AVG}$ (step 306).

The above-mentioned operations can be executed any time during systems operation. Since the target lower limit of the Q-value for each optical signal is set at a level which enables each optical signal to be transmitted without difficulty, none of the signals is interrupted even if the above operations are executed during systems operation. Therefore, pre-emphasis can be set according to customer demand, thereby allowing various operation forms, in which the setting of pre-emphasis is conducted, for example, regularly once a year, after repairs in the case of a problem with the system, and so on.

Figure 12:
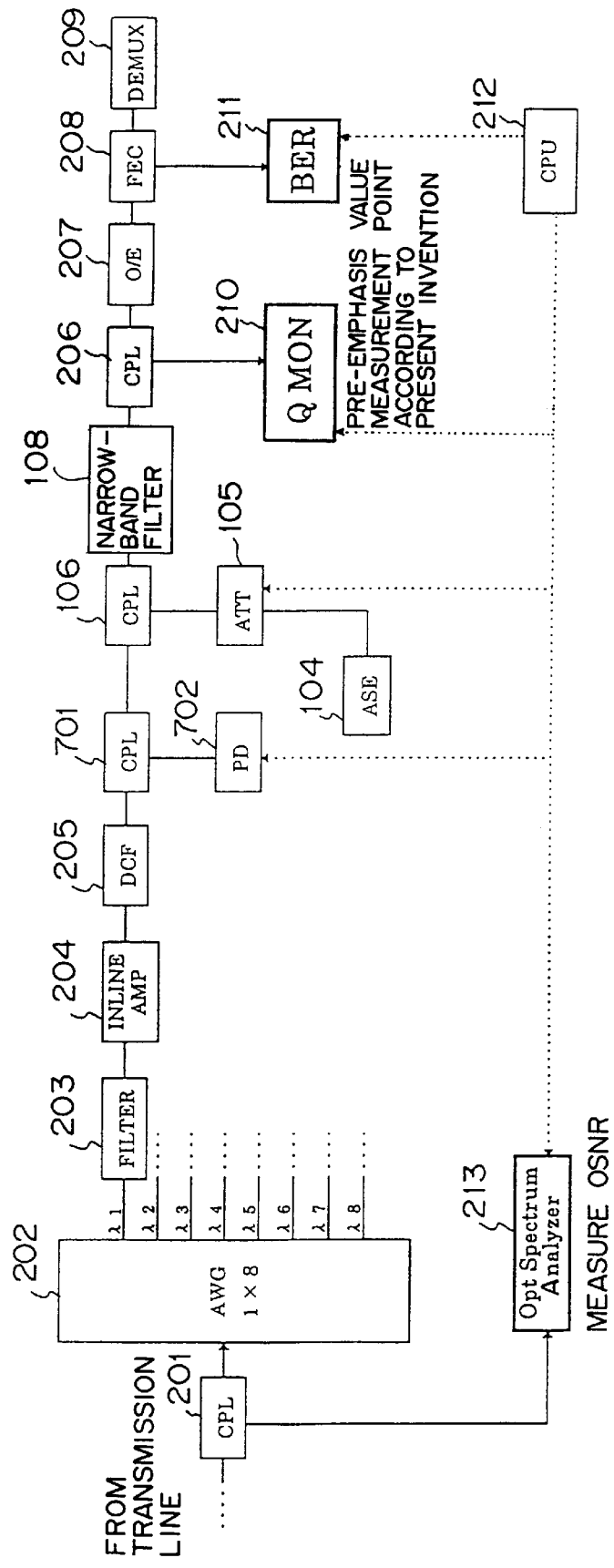
FIG. 12 shows the configuration of a receiver according to another preferred embodiment of the present invention (the setting of pre-emphasis at the receiver)

FIG. 12 shows the configuration of a receiver according to another preferred embodiment of the present invention.

In this configuration, the control of an OSNR is executed not within a transmitter but within the receiver, since each function, corresponding to 104–106 and 108 of the transmitter according to the preferred embodiment as shown in FIG. 6, is located in the receiver as shown in FIG. 12.

In this case, the OSNR for each optical signal is measured by the optical spectrum analyzer 213, to which the output from the coupler 201 is inputted, and the peak power of each optical signal is measured by a photodiode 702, to which the output from the coupler 701 is inputted. Based on the measured OSNR and peak power, the CPU 212 determines the amount of attenuation required by the attenuator 105 (a pre-emphasis value), and adjusts the OSNR for each optical signal.

The explanation of the operation principle of the Q monitor 210, as shown in FIG. 7 or 12, is given below.

After converting an optical signal into an electric signal, the Q monitor 210 measures the distribution of a noise by changing the distinguished value of a signal at each of the mark side and the space side on a eye-pattern, and measures an error rate at each of the mark side and the space side. Then the Q monitor 210 approximates each of two error rate curves, obtained as a result of the measurement, to a line, and calculates a Q-value by obtaining the intersection point of the two lines representing characteristics.

Figure 13:
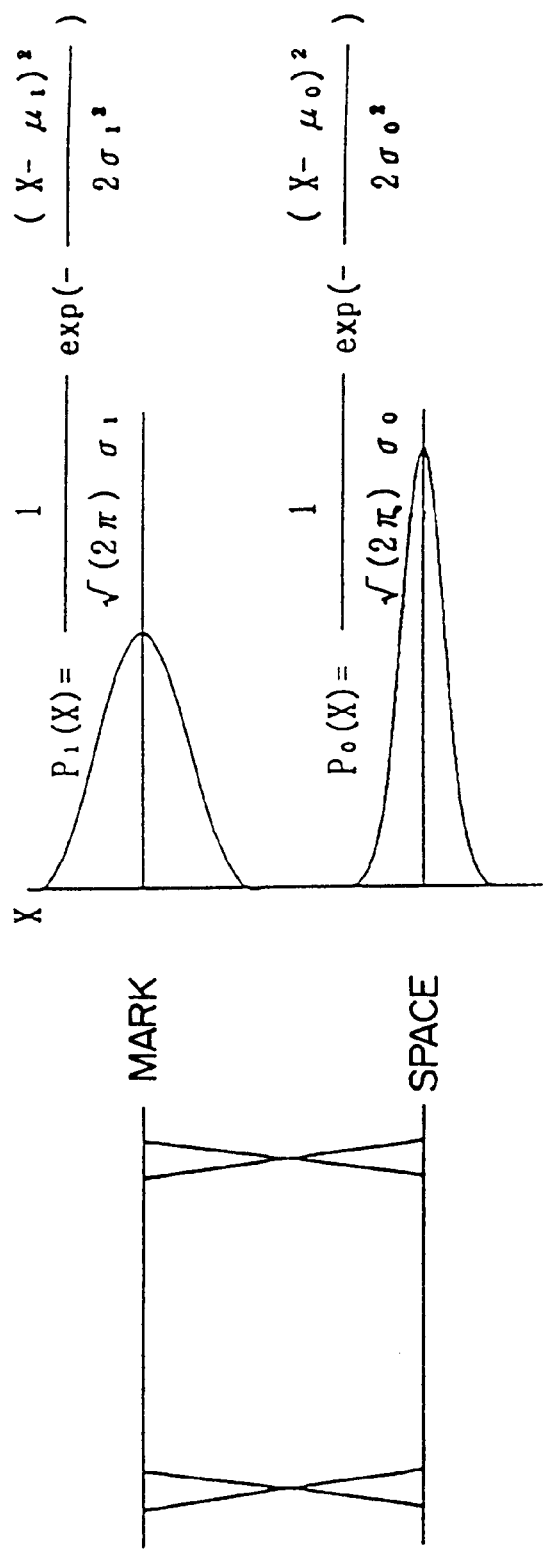
FIG. 13 shows the relation between an eye-pattern and a noise distribution.

The relation between the eye-pattern and noise distribution of a signal can be shown by a model as shown in FIG. 13, wherein: $P_1(X)$ and $P_0(X)$ is a noise probability distribution function at the mark side and space side, respectively; $\mu_1$ and $\mu_0$ are the mean values of each probability distribution, and represent a signal level; and $\sigma_1$ and $\sigma_0$ are the variances of each probability distribution, and represent the RMS value of a noise.

Here, a Q-value is given by the following equations:

$$Q = \frac{|\mu_1 - \mu_0|}{(\sigma_0 + \sigma_1)} \quad \text{[Equation 4]}$$

$$Q_{dB} = 20 \text{LOG}_{10}\left\{\frac{|\mu_1 - \mu_0|}{(\sigma_0 + \sigma_1)}\right\}$$

Next, the method for measuring $\mu_1$, $\mu_0$, $\sigma_0$, and $\sigma_1$ is explained below.

The correlation between the BER at the mark side, and $\mu_1$, $\sigma_1$ and $D_1$ (a discrimination level) is given by the following approximation equation:

$$\frac{(\mu_1 - D_1)}{\sigma_1} = \phi^{-1}(X) \approx 1.192 - 0.6681X - 0.0162X^2 \quad \text{[Equation 5]}$$

$$X = \text{LOG}_{10}(BER)$$

Likewise, the following equation is valid for the space side:

$$\frac{(D_1 - \mu_0)}{\sigma_0} = \phi^{-1}(X) \approx 1.192 - 0.6681X - 0.0162X^2 \quad \text{[Equation 6]}$$

$$X = \text{LOG}_{10}(BER)$$

Figure 14:
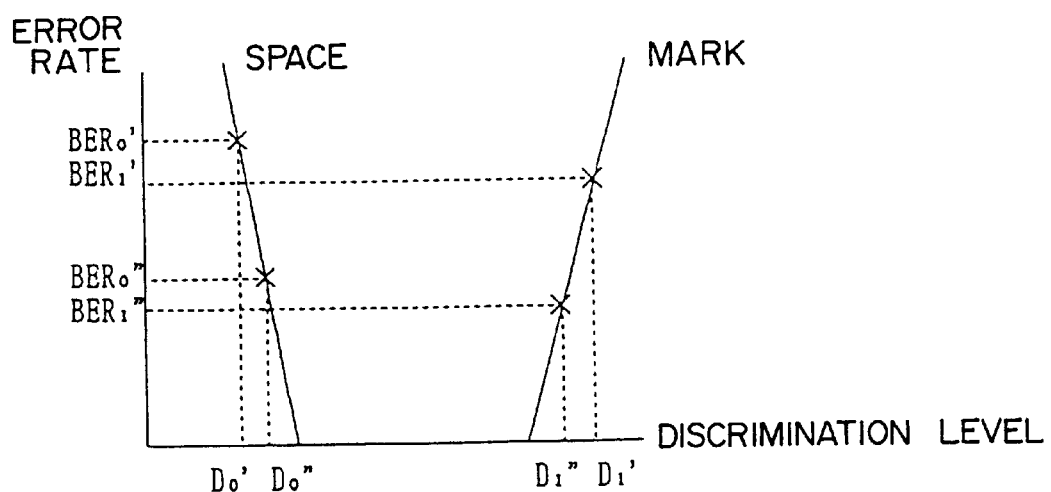
FIG. 14 shows an error rate in the case of a variable discrimination level.

The values of $BER_0'$, $BER_0''$, $BER_1'$, $BER_1''$, $D_0'$, $D_0''$, $D_1'$, and $D_1''$ are obtained, after a BER is obtained at two points on each of the mark side and the space side by changing a discrimination level as 10 shown in FIG. 14. From these obtained values, $\mu_0$, $\mu_1$, $\sigma_0$, and $\sigma_1$ can be calculated as shown by the following equation:

$$\sigma_1 = \frac{(D_1'' - D_1')}{\{\phi^{-1}(X_1') - \phi^{-1}(X_1'')\}} \quad \text{[Equation 7]}$$

$$\mu_1 = \frac{\{D_1'' \phi^{-1}(X_1') - D1' \phi^{-1}(X_1'')\}}{\{\phi^{-1}(X_1') - \phi^{-1}(X_1'')\}}$$

$$\sigma_0 = \frac{(D0' - D_0'')}{\{\phi^{-1}(X_0') - \phi^{-1}(X_0'')\}}$$

$$\mu_0 = \frac{\{D_0'' \phi^{-1}(X_0') - D_0' \phi^{-1}(X_0'')\}}{\{\phi^{-1}(X_0') - \phi^{-1}(X_0'')\}}$$

From these calculation results and Equation 4, a Q-value can be calculated.

What is claimed is:

1. An apparatus for making transmission characteristics uniform in a wavelength division multiplexing optical communications system, comprising:

relation calculating means for calculating a relation between changes in a signal-to-noise ratio and changes in a transmission error rate at a receiving end, for each optical signal to be wavelength-division-multiplexed; and signal-to-noise ratio changing means for changing the signal-to-noise ratio for each optical signal so as to make the transmission error rate uniform at the receiving end for the optical signals, based on the relation.

2. The apparatus according to claim 1, wherein said transmission error rate is either a Q-value or bit error rate.

3. A method for making transmission characteristics uniform in a wavelength division multiplexing optical communications system, comprising the steps of:

calculating a relation between changes in a signal-to-noise ratio and changes in a transmission error rate at a receiving end, for each optical signal to be wavelength-division-multiplexed; and changing the signal-to-noise ratio for each optical signal so as to make the transmission error rate uniform at the receiving end for the optical signals, based on the relation.

4. The method according to claim 3, wherein said transmission error rate is either a Q-value or bit error rate.

5. An apparatus for making transmission characteristics uniform in a wavelength division multiplexing optical communications system, comprising:

margin calculating means for calculating a difference between a reference value and a value of a current signal-to-noise ratio as a margin for each optical signal to be wavelength-division-multiplexed, the reference value being a value of a signal-to-noise ratio corresponding to a target lower limit of a transmission error rate at a receiving end; and signal-to-noise ratio control means for controlling the signal-to-noise ratio for each optical signal so as to keep the signal-to-noise ratio at a prescribed value which is determined by the margins calculated by the margin calculating means for the optical signals.

6. The apparatus according to claim 5, wherein said prescribed value which is determined by the margins calculated for the optical signals is an average of the margins calculated for the optical signals.

7. The apparatus according to claim 5, wherein said transmission error rate is either a Q-value or bit error rate.

8. A method for making transmission characteristics uniform in a wavelength division multiplexing optical communications system, comprising the steps of:

calculating a difference between a reference value and a value of a current signal-to-noise ratio as a margin for each optical signal to be wavelength-division-multiplexed, the reference value being a value of a signal-to-noise ratio corresponding to a target lower limit of a transmission error rate at a receiving end; and controlling the signal-to-noise ratio for each optical signal so as to keep the signal-to-noise ratio at a prescribed value which is determined by the margins calculated for the optical signals.

9. The method according to claim 8, wherein said prescribed value which is determined by the margins calculated for the optical signals is an average of the margins calculated for the optical signals.

10. The method according to claim 8, wherein said transmission error rate is either a Q-value or bit error rate.

11. An apparatus for making transmission characteristics uniform in a wavelength division multiplexing optical communications system, comprising:

first storing means for storing an initial value of a signal-to-noise ratio for each optical signal to be wavelength-division-multiplexed;

signal-to-noise ratio reducing means for gradually reducing the signal-to-noise ratio for each optical signal by superposing an amplified spontaneous emission noise on the optical signal until a transmission error rate at a receiving end decreases to a target lower limit;

second storing means for storing a value of the signal-to-noise ratio at a time at which the transmission error rate at the receiving end decreases to the target lower limit, the value of the signal-to-noise ratio being stored as a target lower limit for each optical signal;

margin calculating means for calculating an amount of a change from the initial value stored in the first storing means to the target lower limit stored in the second storing means, the amount of the change being calculated as a margin for each optical signal;

pre-emphasis value calculating means for calculating a difference between a prescribed value which is determined by the margins calculated by the margin calculating means for the optical signals and the initial value stored in the first storing means, the difference being calculated as a pre-emphasis value of the signal-to-noise ratio for each optical signal; and signal-to-noise ratio control means for controlling the signal-to-noise ratio for each optical signal by superposing an amplified spontaneous emission noise corresponding to the pre-emphasis value on the optical signal.

12. The apparatus according to claim 11, wherein said superposition of the amplified spontaneous emission noise on the optical signal is conducted at a transmitting end.

13. The apparatus according to claim 11, wherein said superposition of the amplified spontaneous emission noise on the optical signal is conducted at the receiving end.

14. The apparatus according to claim 11, wherein said prescribed value which is determined by the margins calculated for the optical signals is an average of the margins calculated for the optical signals.

15. The apparatus according to claim 11, wherein said transmission error rate is either a Q-value or bit error rate.

16. A method for making transmission characteristics uniform in a wavelength division multiplexing optical communications system, comprising the steps of:

storing an initial value of a signal-to-noise ratio for each optical signal to be wavelength-division-multiplexed;

gradually reducing the signal-to-noise ratio for each optical signal by superposing an amplified spontaneous emission noise on the optical signal until a transmission error rate at a receiving end decreases to a target lower limit;

storing a value of the signal-to-noise ratio at a time at which the transmission error rate at the receiving end decreases to the target lower limit, the value of the signal-to-noise ratio being stored as a target lower limit for each optical signal;

calculating an amount of a change from the stored initial value to the stored target lower limit as a margin for each optical signal;

calculating a difference between a prescribed value which is determined by the margins calculated for the optical signals and the stored initial value, the difference being calculated as a pre-emphasis value of the signal-to-noise ratio for each optical signal; and controlling the signal-to-noise ratio for each optical signal by superposing an amplified spontaneous emission noise corresponding to the pre-emphasis value on the optical signal.

17. The method according to claim 16, wherein said superposition of the amplified spontaneous emission noise on the optical signal is conducted at a transmitting end.

18. The method according to claim 16, wherein said superposition of the amplified spontaneous emission noise on the optical signal is conducted at the receiving end.

19. The method according to claim 16, wherein said prescribed value which is determined by the margins calculated for the optical signals is an average of the margins calculated for the optical signals.

20. The method according to claim 16, wherein said transmission error rate is either a Q-value or bit error rate.

* * * * *